US010174868B2

United States Patent
Ditty et al.

(10) Patent No.: US 10,174,868 B2
(45) Date of Patent: Jan. 8, 2019

(54) INTERNALLY SUPPORTED POWER TRACK

(71) Applicant: Oshkosh Corporation, Oshkosh, WI (US)

(72) Inventors: McKenzie M. Ditty, Hagerstown, MD (US); Matthew G. Wilson, Hagerstown, MD (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 15/784,773

(22) Filed: Oct. 16, 2017

(65) Prior Publication Data

US 2018/0038517 A1 Feb. 8, 2018

Related U.S. Application Data

(63) Continuation of application No. 13/789,151, filed on Mar. 7, 2013, now Pat. No. 9,791,071.

(51) Int. Cl.
*F16L 3/015* (2006.01)
*B66F 11/04* (2006.01)
(Continued)

(52) U.S. Cl.
CPC ............. *F16L 3/015* (2013.01); *B66C 13/12* (2013.01); *B66C 23/705* (2013.01); *B66F 11/046* (2013.01)

(58) Field of Classification Search
CPC ... F16G 13/16; Y10S 414/131; B66C 23/701; B66C 23/702; B66C 23/703;
(Continued)

(56) References Cited

U.S. PATENT DOCUMENTS 3,284,036 A * 11/1966 Nansel .................... B66C 13/12
191/12 C
3,776,367 A * 12/1973 Grove ................... B66F 11/046
182/2.11
(Continued)

FOREIGN PATENT DOCUMENTS

EP 0 239 302 9/1987
EP 0 308 758 A2 3/1989
(Continued)

OTHER PUBLICATIONS

International Search Report and Written Opinion for PCT Application No. PCT/US2014/018237, dated Jun. 12, 2014, 17 pages.

*Primary Examiner* — Katherine W Mitchell
*Assistant Examiner* — Shiref M Mekhaeil
(74) *Attorney, Agent, or Firm* — Foley & Lardner LLP

(57) ABSTRACT

A boom assembly for a lift device includes a plurality of telescoping boom sections. The plurality of telescoping boom sections include a base boom section, a mid boom section, and a fly boom section. The plurality of telescoping boom sections define an inner volume. The boom assembly also includes a push tube coupled to the base boom section and a support member positioned within the inner volume. The support member includes sidewalls having an inner surface and an outer surface. The boom assembly also includes a power track positioned within the inner volume that includes a plurality of movable links, a first supported portion that interfaces with at least one of the inner surface of the support member and a surface of the push tube, and a second supported portion that interfaces with the outer surface of the support member.

16 Claims, 12 Drawing Sheets

(51) Int. Cl.
*B66C 13/12* (2006.01)
*B66C 23/70* (2006.01)

(58) Field of Classification Search
CPC ... B66C 23/705; B66C 23/706; B66C 23/707; B66C 11/046; B66C 13/12; F16L 3/015
See application file for complete search history.

(56) References Cited

U.S. PATENT DOCUMENTS

| | | | |
|---|---|---|---|
| 4,118,907 A | 10/1978 | Small et al. | |
| 4,132,040 A | 1/1979 | Grove | |
| 4,133,411 A * | 1/1979 | Curb | B66F 11/046 182/2.11 |
| 4,360,077 A | 11/1982 | Abbott | |
| 4,470,229 A * | 9/1984 | Muse | B66C 13/12 414/918 |
| 4,506,480 A | 3/1985 | Murrill et al. | |
| 4,588,347 A | 5/1986 | Murta | |
| 4,789,120 A * | 12/1988 | Spidel | B66F 11/046 182/141 |
| 4,809,472 A | 3/1989 | Hade et al. | |
| 5,060,427 A * | 10/1991 | Bernabe, Jr. | B66C 23/701 182/141 |
| 5,178,247 A * | 1/1993 | Vagaggini | F16G 13/16 191/12 C |
| 5,649,415 A * | 7/1997 | Pea | F16G 13/16 191/12 C |
| 5,695,082 A * | 12/1997 | Rainwater | B66C 23/705 212/177 |
| 5,718,345 A * | 2/1998 | Hade, Jr. | B66C 13/12 212/349 |
| 5,924,837 A * | 7/1999 | Passmann | B66C 13/12 414/718 |
| 6,125,895 A | 10/2000 | Camirand et al. | |
| 6,199,707 B1 * | 3/2001 | Suzuki | B66C 13/12 212/349 |
| 7,090,086 B2 * | 8/2006 | Dupre | B66C 13/12 212/350 |
| 2003/0205547 A1 | 11/2003 | Dupre et al. | |
| 2011/0031203 A1 * | 2/2011 | Chapman | B66C 23/701 212/196 |
| 2015/0211658 A1 * | 7/2015 | Lu | F16L 3/015 59/78.1 |
| 2015/0259185 A1 * | 9/2015 | Ditty | B66F 17/006 182/19 |

FOREIGN PATENT DOCUMENTS

| | | |
|---|---|---|
| EP | 0 704 406 | 4/1996 |
| FR | 2553396 | 4/1885 |
| JP | 55-046498 | 3/1980 |
| JP | 05-097400 A | 4/1993 |
| JP | 08-012268 | 1/1996 |
| JP | 04-580768 | 8/2006 |
| JP | 2012-012128 | 1/2012 |

\* cited by examiner

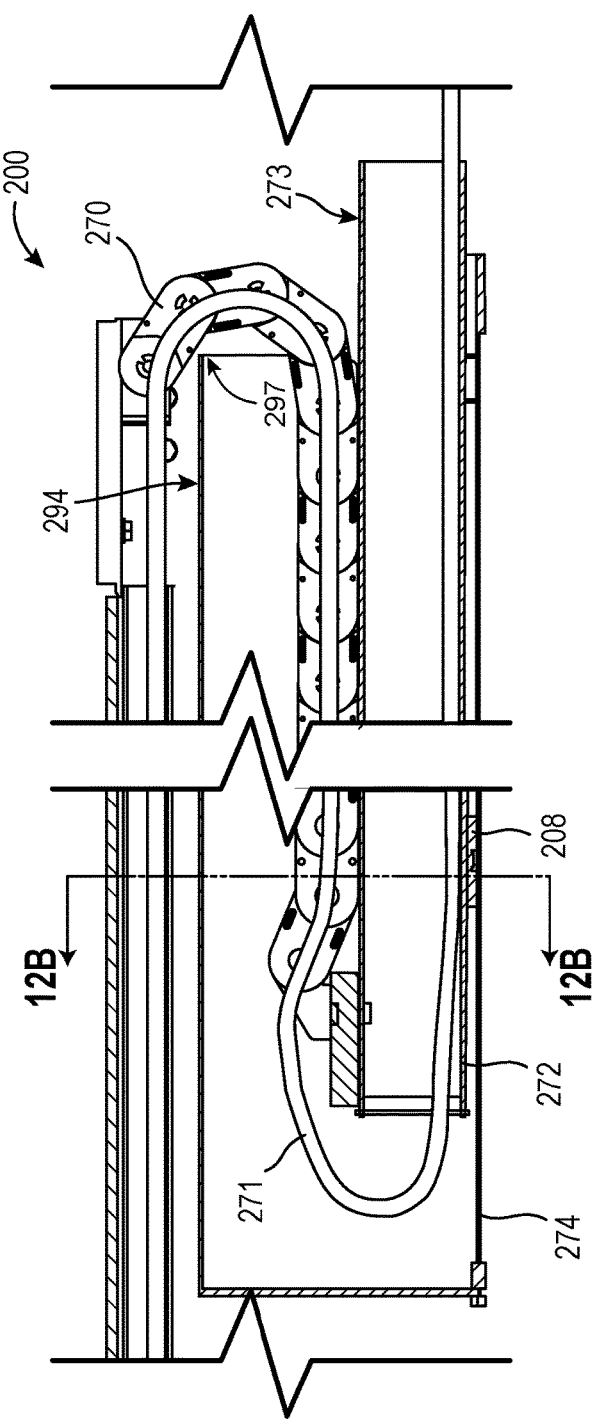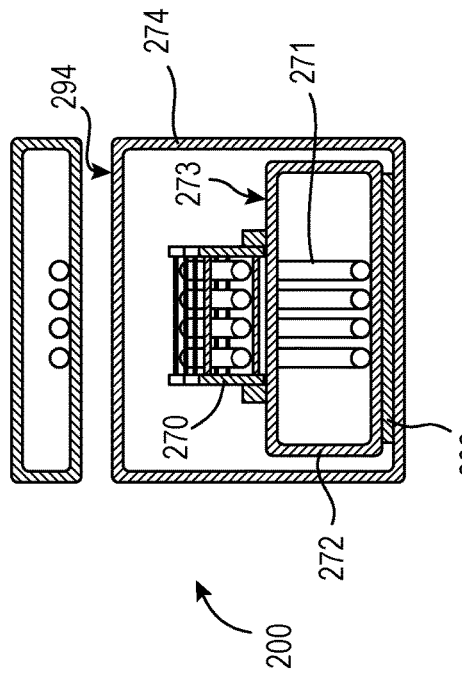
FIG. 12A
FIG. 12B

INTERNALLY SUPPORTED POWER TRACK

CROSS-REFERENCE TO RELATED APPLICATIONS

This is a continuation of application Ser. No. 13/789,151, filed Mar. 7, 2013, which is incorporated herein by reference in its entirety.

BACKGROUND

The present application relates generally to the field of lift devices. More specifically, the present application relates to a device for supporting hydraulic and electrical lines extending between a chassis and an aerial work platform. Aerial work platforms are used in various applications (e.g., construction, maintenance, etc.) and support an operator in an elevated position. A telescoping boom couples the aerial work platform to a chassis of the lift machine, and a hydraulic system (e.g., hydraulic hoses, telescopic cylinders, etc.) extends the telescoping boom and aerial work platform. Controls for the hydraulic system may be located on the aerial work platform to allow an operator to position the aerial work platform from an elevated position. Hydraulic, pneumatic, and electrical lines extend between the chassis and the aerial work platform to facilitate such control.

Traditional lift devices include a carrier to support the weight of the hydraulic, pneumatic, and electrical lines that extend between the chassis and the aerial work platform. The carrier is traditionally coupled to the outside of the telescoping boom sections with support brackets. The external position of the carrier exposes the hydraulic, pneumatic, and electrical lines therein to damage (e.g., due to contact with a beam at a construction site, due to falling debris, etc.). Further, supporting the carrier with brackets at several locations along its length may expose the hydraulic, pneumatic, and electrical lines to adverse strain conditions (i.e. the weight of the lines may damage the ends, couplers, or the line itself). Other traditional lift devices include a carrier positioned partially within the boom section, but removal of such carriers for service to the lines (e.g., replace a connection, check the connection for leaks, etc.) may be difficult and require disassembly of the telescoping boom assembly. Further, these traditional designs do not support the length of the carrier, thereby exposing the lines to damage.

SUMMARY

One embodiment relates to a boom assembly for a lift device that includes a plurality of telescoping boom sections. The plurality of telescoping boom sections include a base boom section, a mid boom section, and a fly boom section. The plurality of telescoping boom sections define an inner volume. The boom assembly also includes a push tube coupled to the base boom section and a support member positioned within the inner volume. The support member includes sidewalls having an inner surface and an outer surface. The boom assembly also includes a power track positioned within the inner volume that includes a plurality of movable links, a first supported portion that interfaces with at least one of the inner surface of the support member and a surface of the push tube, and a second supported portion that interfaces with the outer surface of the support member.

Another embodiment relates to a modular lift device that includes a plurality of telescoping boom sections, a channel, and a cartridge. The plurality of telescoping boom sections include a base boom section, a mid boom section, and a fly boom section. The plurality of telescoping boom sections define an inner volume. The channel is positioned within the inner volume of the plurality of telescoping boom sections and coupled to the mid boom section. The cartridge is removably positioned within the inner volume and includes a push tube and a power track. The push tube is coupled to the channel and the base boom section, and the power track includes a first end coupled to the push tube and a second end coupled to the fly boom section.

Yet another embodiment relates to a lift device including a chassis, a plurality of telescoping boom sections, a support member, and a power track. The plurality of telescoping boom sections are coupled to the chassis and include a base boom section, a mid boom section, and a fly boom section. The plurality of telescoping boom sections define an inner volume. The support member is positioned within the inner volume and includes sidewalls having an inner surface and an outer surface. The power track is positioned within the inner volume and includes a first portion that interfaces with the inner surface of the support member and a second portion that interfaces with the outer surface of the support member.

The invention is capable of other embodiments and of being carried out in various ways. Alternative exemplary embodiments relate to other features and combinations of features as may be generally recited in the claims.

BRIEF DESCRIPTION OF THE DRAWINGS

The invention will become more fully understood from the following detailed description taken in conjunction with the accompanying drawings wherein like reference numerals refer to like elements, in which:

FIGS. 12A-12B are sectional views of a boom assembly, according to an exemplary embodiment.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

According to an exemplary embodiment, a lift device includes a work implement (e.g., a work platform, forks, etc.) coupled to a base by a boom assembly. The lift device further includes a power track to deliver hydraulic, pneumatic, and electrical power from the base to the platform. The power track is positioned within the boom assembly and includes a number of links that support hydraulic hoses, pneumatic lines, and electrical cables. The power track spans the length of the boom, and the associated hydraulic hoses, pneumatic lines, and electrical cables are enclosed within the boom assembly of the lift device.

According to an exemplary embodiment, the power track is coupled to and moves with the boom assembly. The entirety (i.e. the length of the power track other than a bend portion, over ninety percent of the length, over ninety-five percent of the length, etc.) of the power track is supported by an internal support member as the boom assembly is extended between a fully retraced and a fully extended position. A cartridge including several components of the power track is removable through the end of the boom structure. A removable cartridge facilitates servicing or replacing fittings, couplers, hoses, or other components of the carrier system.

Figure 1:
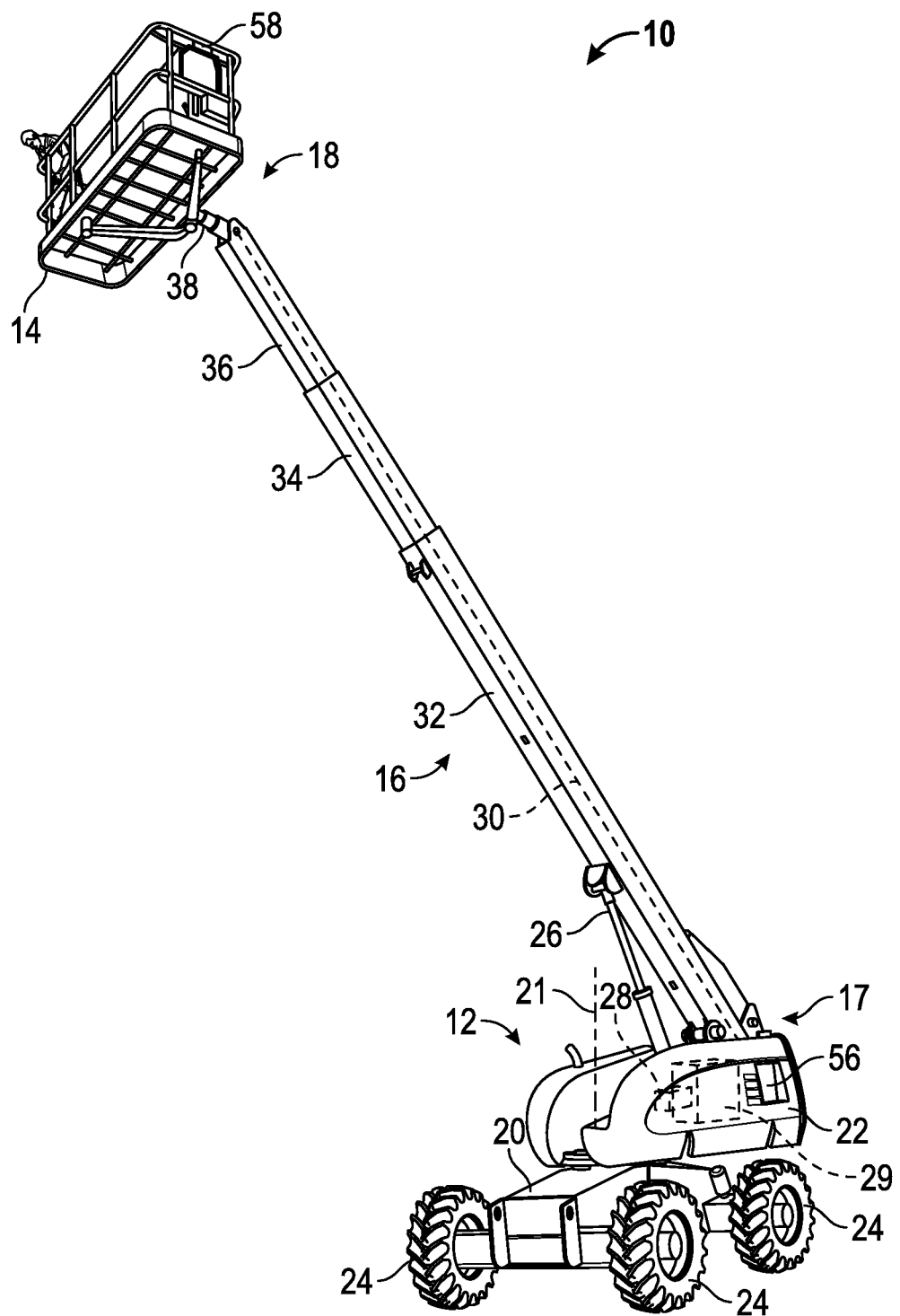
FIG. 1 is a perspective view of a lift device including a boom assembly, according to an exemplary embodiment.

Referring to the exemplary embodiment shown in FIG. 1, a lift device, shown as boom lift 10, includes a chassis, shown as body 12, and a work implement, shown as platform 14. The platform 14 is coupled to the body 12 via a boom assembly, shown as boom 16. According to an exemplary embodiment, platform 14 supports one or more workers. In some embodiments, the boom lift 10 includes an accessory, shown as welder 58, coupled to the platform 14 for use by a worker. In other embodiments, the platform 14 may be equipped with other tools for use by a worker, including pneumatic tools (e.g., impact wrench, airbrush, nail gun, ratchet, etc.), plasma cutters, and spotlights, among other alternatives. In other embodiments, the boom lift 10 includes a different implement coupled to the boom 16 (e.g., a saw, drill, jackhammer, lift forks, etc.) in place of or in addition to the platform 14.

The boom 16 has a first or proximal end 17 pivotally coupled to the body 12 and a second or distal end 18 coupled to the platform 14. By pivoting the boom 16 at the first end 17, the platform 14 may be elevated or lowered to a height above or below a portion of the body 12. The boom 16 has a plurality of telescoping segments that allows the second end 18 and the platform 14 to be moved closer to or away from the first end 17 and the body 12.

As shown in FIG. 1, the body 12 includes a frame, shown as lower works 20, coupled to a turntable, shown as upper works 22. According to an exemplary embodiment, the first end 17 of the boom 16 is coupled to the upper works 22. According to an alternative embodiment, the body 12 does not include a turntable and the boom 16 is coupled directly to the lower works 20 (i.e. the boom 16 may be provided as part of a telehandler). According to still another alternative embodiment, the boom 16 is incorporated as part of an articulating boom lift (e.g., as the main boom, as the tower boom, as both the main boom and the tower boom, etc.).

As shown in FIG. 1, the boom lift 10 is mobile and the lower works 20 includes wheels 24, which may be driven using a prime mover and steered to maneuver the boom lift 10. In other embodiments, the lower works 20 includes other devices to propel or steer the lift device, such as tracks. In still other embodiments, the boom lift 10 is a trailer that is towed by another vehicle, and the lower works 20 may include one or more wheels or elements configured to support the boom lift 10. In still other embodiments, the boom lift 10 may be a stationary device and the lower works 20 may lack any wheels or other elements to facilitate the movement of the lift device and may instead include legs or other similar structures.

The upper works 22 is coupled to the lower works 20 such that the upper works 22 may be rotated relative to the lower works 20 about a vertical axis of rotation 21 (e.g., by a motor). According to an exemplary embodiment, the upper works 22 houses a prime mover that powers one or more of the wheels 24. For example, the upper works 22 may include one or more electric or hydraulic motors to drive the wheels 24. The boom lift 10 may receive power from an external source via a tether (e.g., cable, cord, etc.), may include an on-board generator set to provide electrical power, may include a hydraulic pump coupled to a motor (e.g., electric, internal combustion, etc.), or may include an energy storage device (e.g., batteries).

According to an exemplary embodiment, the upper works 22 includes an internal structure configured to support the boom 16. The internal structure may interface with the first end 17 of the boom 16. A lift actuator, shown as hydraulic cylinder 26, is coupled between the upper works 22 and the boom 16. According to an exemplary embodiment, hydraulic cylinder 26 raises or lowers the boom (e.g., to rotate the second end 18 of the boom 16 relative to the upper works 22). As shown in FIG. 1, upper works 22 further includes a hydraulic pump 28 that provides pressurized hydraulic fluid to the hydraulic cylinder 26 and other hydraulic components of the boom lift 10. Upper works 22 includes a hydraulic fluid reservoir 29, according to an exemplary embodiment.

Figure 2:
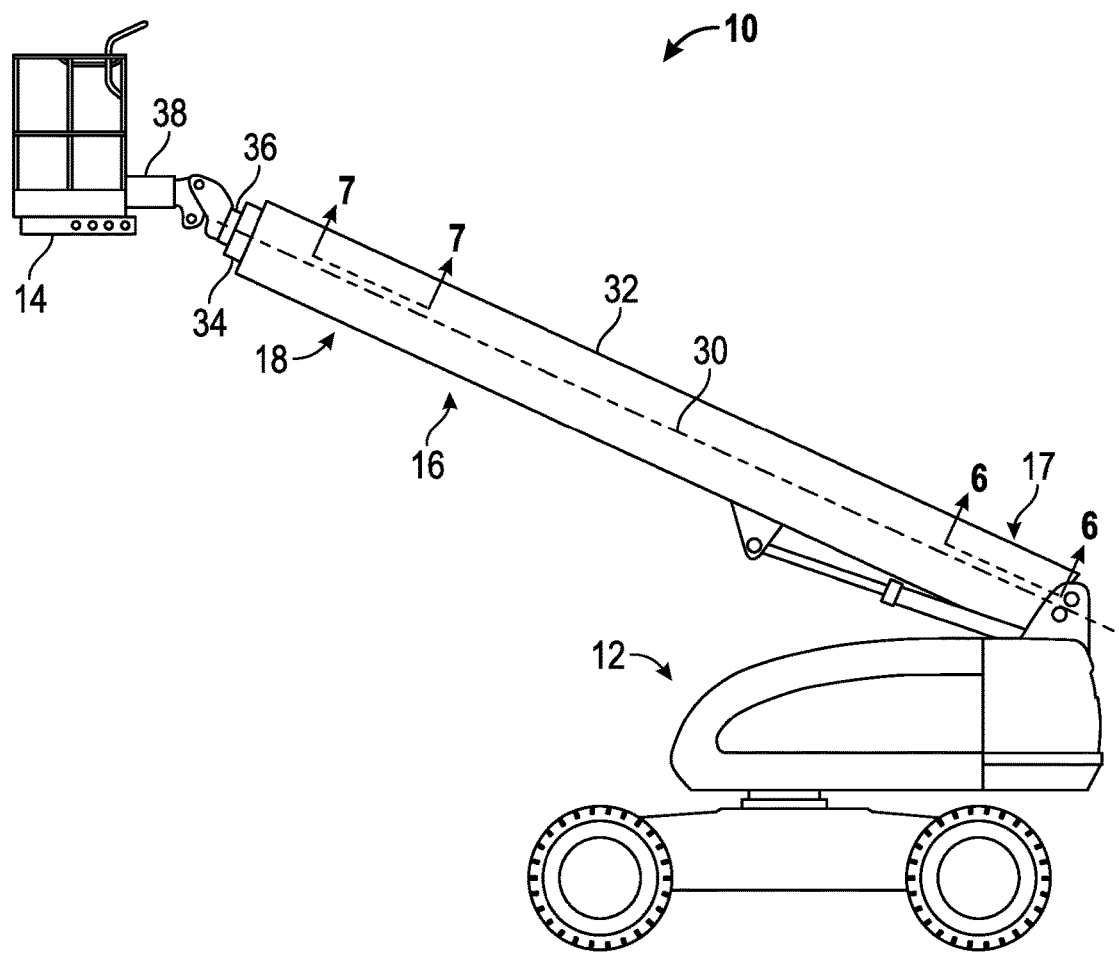
FIG. 2 is a schematic side view of the lift device with the boom assembly in a retracted position, according to an exemplary embodiment.
Figure 3:
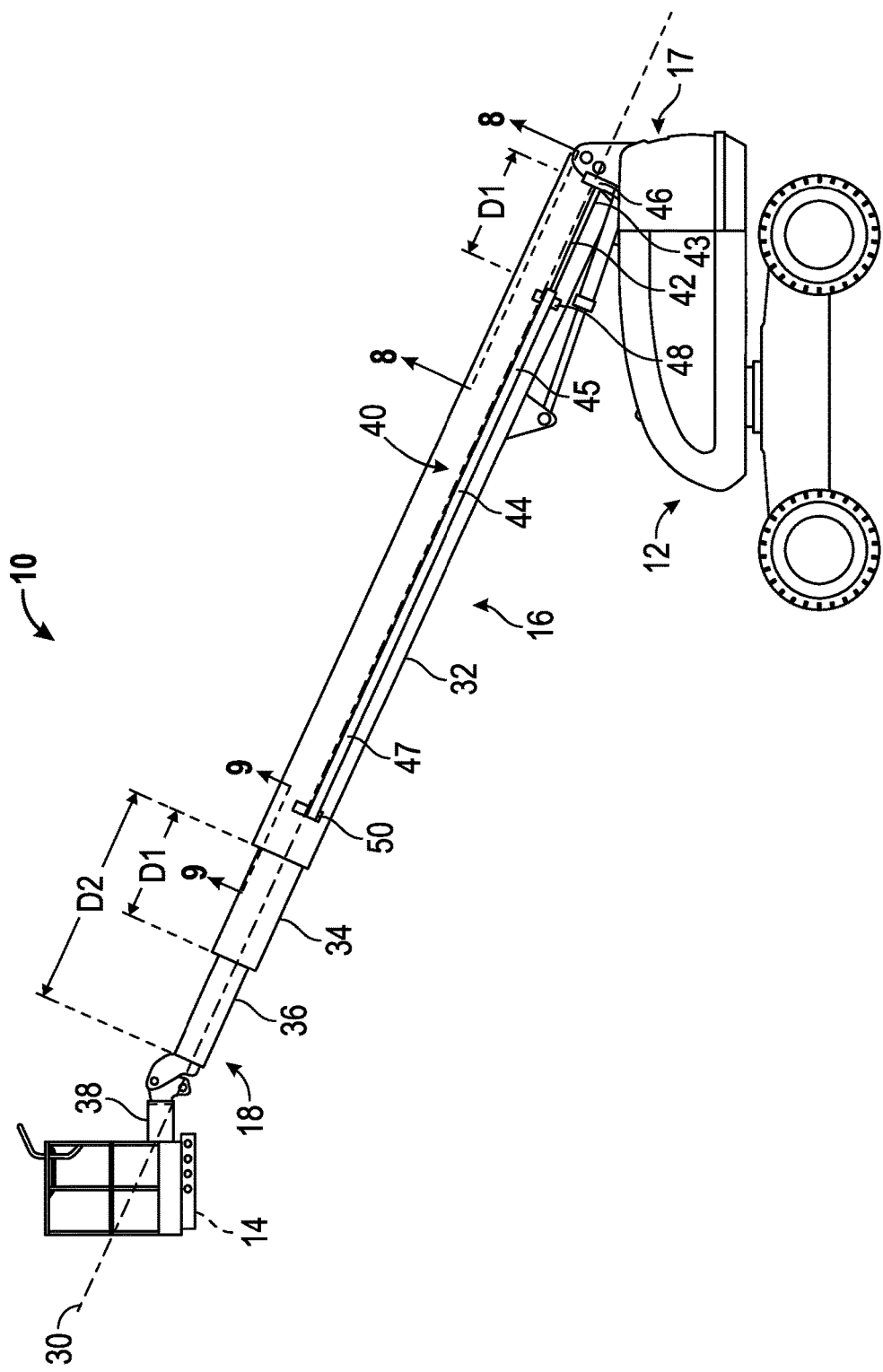
FIG. 3 is a schematic side view of the lift device with the boom assembly in a partially extended position, according to an exemplary embodiment.
Figure 4:
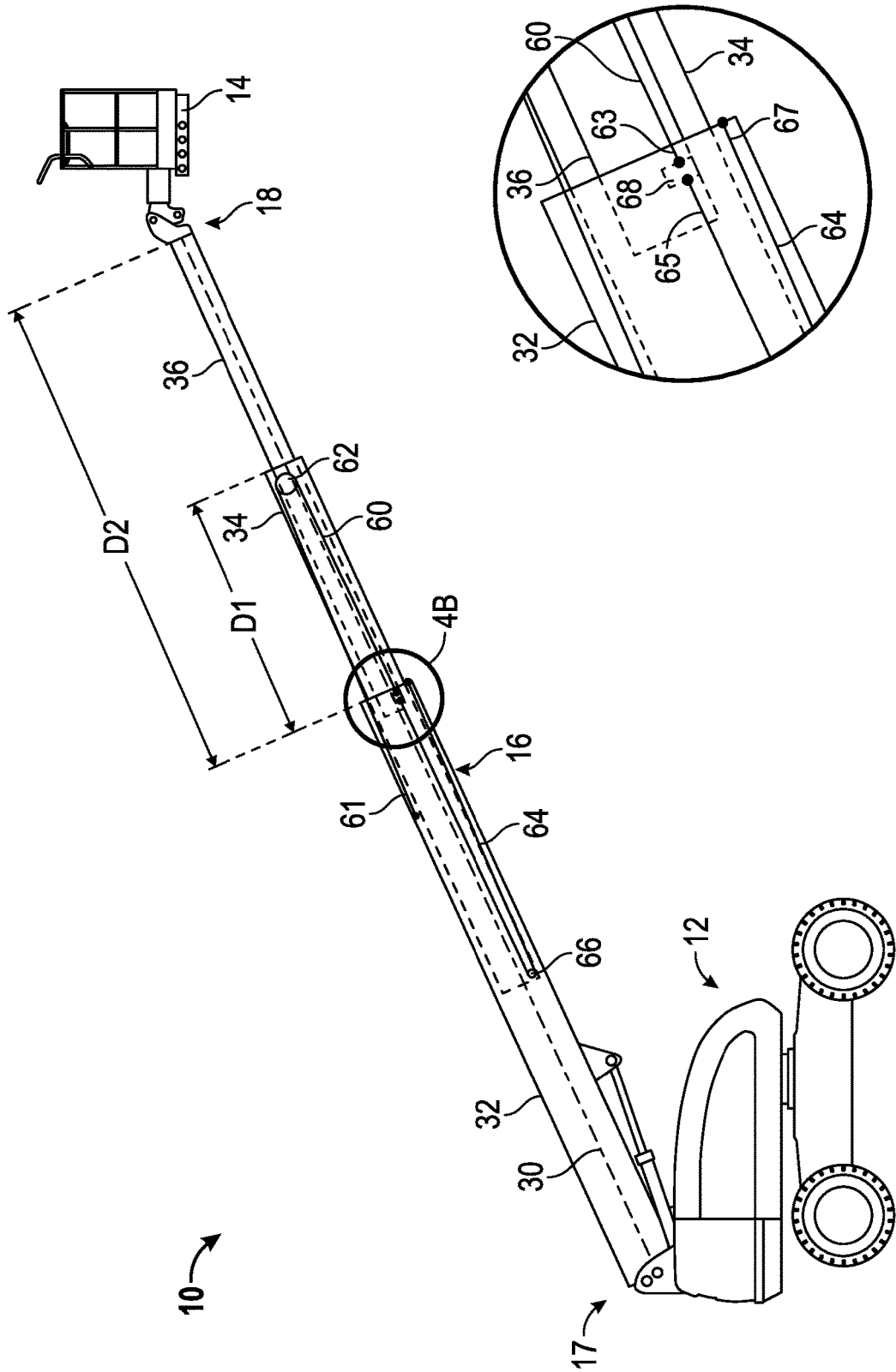
FIG. 4A is a schematic side view of the lift device illustrating a cable and sheave system, according to an exemplary embodiment.
FIG. 4B is a detail view of the cable and sheave system.

Referring next to the exemplary embodiment shown in FIGS. 2 and 3, the boom 16 is a telescoping boom having a plurality of segments that slide relative to each other along a longitudinal axis 30 to increase or decrease the length of the boom 16 and the distance between the platform 14 and the body 12. According to an exemplary embodiment, the boom 16 is a three-piece boom with a first or base boom 32, a second or mid boom 34, and a third or fly boom 36. The base boom 32 is coupled to the upper works 22 and the fly boom 36 is coupled to the platform 14.

In one embodiment, the boom sections (32, 34, and 36) have tubular, rectangular cross sectional shapes. In other exemplary embodiments, the boom sections (32, 34, and 36) may have other cross sectional shapes (e.g., square, hexagonal, round, etc.). While the embodiment shown in FIGS. 1-11 has three boom segments, in other exemplary embodiments, the boom 16 may include more or fewer boom segments. The boom 16 may further include a linkage, shown as connecting linkage 38, that couples the platform 14 to the fly boom 36. According to an exemplary embodiment, the connecting linkage 38 is a rotator. According to an alternative embodiment, the connecting linkage 38 is a jib. According to still another alternative embodiment, the connecting linkage 38 includes both a rotator and a jib. Such connecting linkages 38 may allow the platform 14 to remain level as the boom 16 is raised or lowered. The connecting linkage 38 may be controlled by a self-leveling system including a slave cylinder (e.g., the slave cylinder may operate based on the position of the hydraulic cylinder 26).

Figure 6:
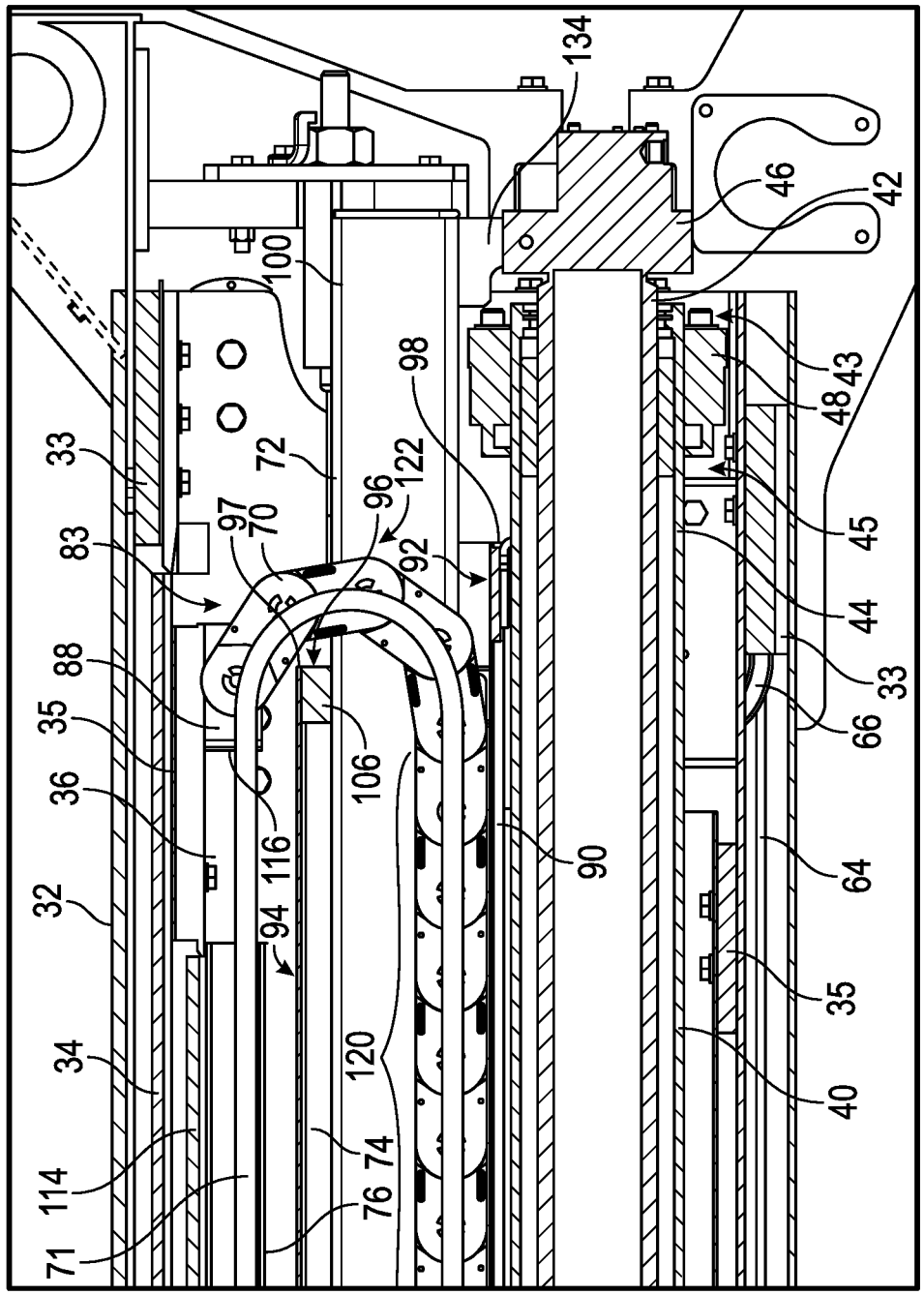
FIG. 6 is a detail cross section view of a portion of the boom assembly.
Figure 7:
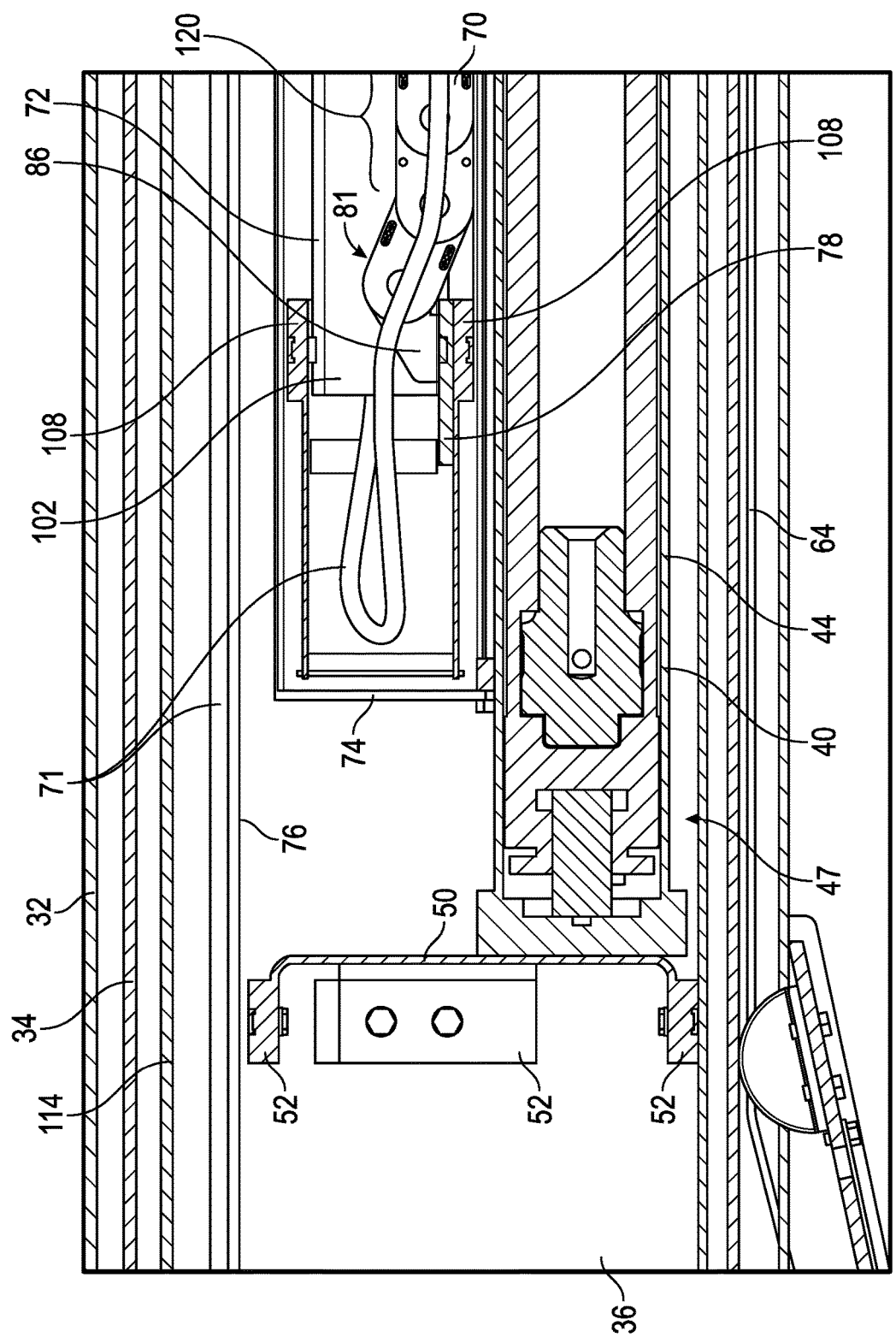
FIG. 7 is a detail cross section view of a portion of the boom assembly.

Referring still to the exemplary embodiment shown in FIG. 3, the base boom 32, the mid boom 34, and the fly boom 36 move relative to each other along the longitudinal axis 30 as the boom 16 is extended or retracted. With the base boom 32 stationary, the mid boom 34 moves at a constant rate relative to the base boom 32 and the fly boom 36 moves at a constant rate relative to the mid boom 34 (i.e. the relative movement occurs at a fixed ratio). The boom lift 10 includes an actuator, shown as cylinder 40, provided within the boom 16 to extend or retract the boom 16. The cylinder 40 may include a rod 42 and an outer barrel 44. According to the exemplary embodiment shown in FIGS. 6-7, the distal end 43 of the rod 42 is coupled to the base boom 32 proximate the first end 17 of the boom 16 with a bracket 46. The cylinder 40 extends along the length of the boom 16 and extends through the end of the mid boom 34. As shown in FIG. 6, the end 45 of the outer barrel 44 is coupled to the mid boom 34 with a bracket 48. As shown in FIG. 7, the distal end 47 of the outer barrel 44 is coupled to a slide bracket 50, which supports the distal end 47 within the fly boom 36. The slide bracket 50 slidably engages the interior surfaces of the fly boom 36 via slide bearings 52.

A hydraulic system includes the cylinder 40, the hydraulic pump 28, and the hydraulic fluid reservoir 29. The flow of pressurized hydraulic fluid through the hydraulic system to and from the cylinder 40 may be controlled with manual controls or user interfaces (e.g., levers, buttons, switches, touch screen interfaces, etc.). As shown in FIG. 1, the boom lift 10 includes a control panel 56 on the body 12. The control panel 56 facilitates the operation of the boom 16 (e.g., extension, retraction, lift angle, etc.) by an operator. According to an alternative embodiment, the boom lift 10 may include controls coupled to the platform 14. According to still another alternative embodiment, the boom lift 10 may include controls coupled to both the platform 14 and the body 12.

Referring next to the exemplary embodiment shown in FIGS. 4A and 4B, the boom sections (32, 34, 36) are coupled together via a mechanism (e.g., a cable and sheave system) such that the fly boom 36 extends relative to the base boom 32 at twice the rate that the mid boom 34 extends relative to the base boom 32. According to an exemplary embodiment, a first cable 60 is anchored to a first end 61 of the base boom 32, interfaces with a first sheave 62 coupled to the mid boom 34, and is anchored to a second end 63 of the fly boom 36. A second cable 64 is anchored to a first end 65, to the fly boom 36, (e.g., to a common bracket 68 with the second end 63 of the first cable 60), passes over a second sheave 66 coupled to the mid boom 34, and is anchored on a second end 67 to the base boom 32. The cables 60 and 64 and the sheaves 62 and 66 therefore form a pulley system with the sheaves 62 and 66 being moveable pulleys. As the boom 16 is extended or retracted through the action of the cylinder 40, the ends 61 and 67 coupled to the base boom 32 remain stationary and the sheaves 62 and 66 move relative to the ends 61 and 67 a first distance (D1) determined by the extension or retraction of the cylinder 40. During extension of the boom 16, the first sheave 62 acts upon the second end 63 of the first cable 60 to extend the fly boom 36 a distance (D2) equal to twice the distance (D1) relative to the base boom 32. Conversely, during retraction of the boom 16, the second sheave 66 acts upon the first end 65 of the second cable 64 to retract the fly boom 36 a distance (D2) relative to the base boom 32 equal to twice the distance (D1) of the retraction of the mid boom 34.

Referring next to the exemplary embodiment shown in FIGS. 5-11, lines 71 extend through the interior volume 19 of the boom 16 for controlling electrical power and pressurized hydraulic fluid or air to various electrical, pneumatic, and hydraulic systems on the platform 14 or the boom 16. The lines 71 are managed by an articulated power track, shown as carrier 70, that supports and routes the lines 71 through the boom 16. The carrier 70 is supported within the boom 16 with a channel (i.e. support member, etc.), shown as member 74. According to an exemplary embodiment, member 74 is coupled to mid boom 34 and slidably coupled to a push tube, shown as tube 72. Lines 71 are routed from the first end 17 of the boom 16 to the second end 18 of the boom 16 through the tube 72, through the carrier 70 and through a fly tube 76 coupled to the fly boom 36. The carrier 70 and the tube 72 may be extracted from the interior volume 19 of the boom 16 as part of magazine 130 to facilitate the servicing of the carrier 70 and the lines 71 supported by the carrier 70.

Figure 5:
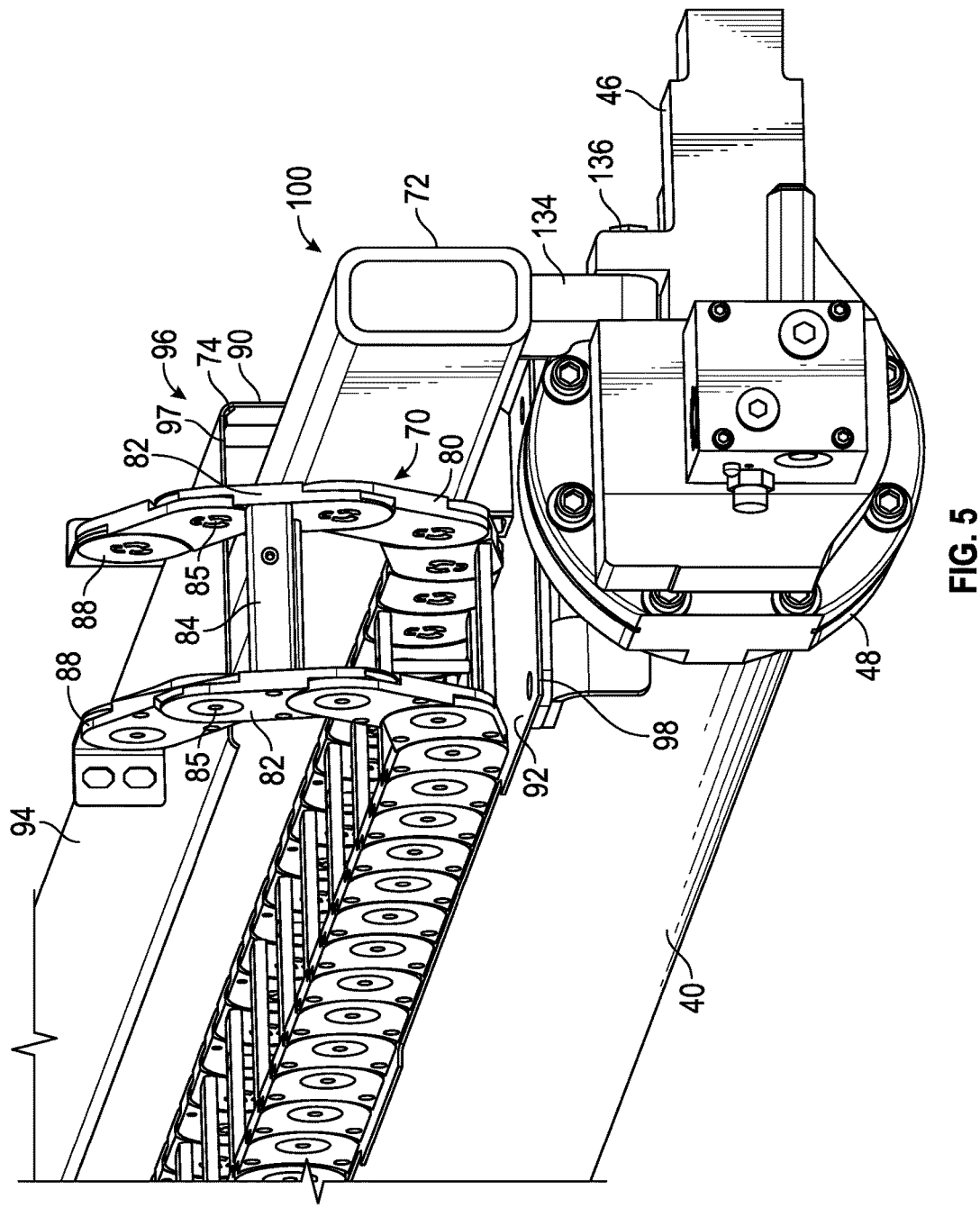
FIG. 5 is an elevation view of an internal cable management device for a boom assembly, according to an exemplary embodiment.

Referring to the exemplary embodiment shown in FIG. 5, the carrier 70 is disposed in the member 74. One of the sidewalls 90 of the member 74 has been removed for clarity. The carrier 70 is formed from a plurality of links 80 each including a pair of side members 82 and a cross-member or brace 84 spanning between and joining the side members 82. Each of the links 80 are coupled to a neighboring link 80 with a pivoting connection such that the links 80 are able to rotate relative to each other about a pivot point 85. As shown in FIGS. 6-11, the lines 71 are received between the side members 82 and between the cross-members 84. As shown in FIGS. 6-7, ends of the carrier 70 are coupled to a first interface link 86 and a second interface link 88. The first interface link 86 couples a first end 81 of the carrier 70 to the tube 72. The second interface link 88 couples a second end 83 of the carrier 70 to the fly boom 36.

Referring still to FIG. 5, the member 74 is a hollow, elongated member with sidewalls 90 that define a first surface, shown as inner surface 92, and a second surface, shown as outer surface 94. According to an exemplary embodiment, the member 74 includes four sidewalls 90 forming a generally rectangular cross sectional shape. The member 74 includes an open end 96 disposed proximate the first end 17 of the boom 16. As shown in FIG. 7, the member 74 is fixed to the outer barrel 44 of the cylinder 40 (e.g., with a bolted connection). The member 74 is therefore timed to and moves with the outer barrel 44 of the cylinder 40. Member 74 is also timed with the mid boom 34, which is fixed to the outer barrel 44 via the bracket 48.

According to an exemplary embodiment, the tube 72 is a hollow, elongated member that is configured to be received in the interior of the member 74 alongside the carrier 70. The tube 72 includes an open first end 100 extending beyond the open end 96 of the member 74 and an open second end 102 disposed within the member 74 at the first end 81 of the carrier 70. According to an exemplary embodiment, the first end 100 is fixed to the base boom 32. The tube 72 may be directly coupled to the base boom 32 or may be indirectly coupled to the base boom 32. By way of example, the tube 72 may be coupled to base boom 32 with a bolted connection and bracket (e.g., as part of bracket 46 that couples the rod 42 of the cylinder 40 to the base boom 32). The tube 72 therefore remains stationary as the boom 16 extends or retracts. As shown in FIG. 6, the tube 72 is slidably coupled to member 74 with a slide bearing, shown as wear pad 106. According to an exemplary embodiment, the second end 102 of tube 72 is coupled to the carrier 70. As shown in FIG. 7, the second end 102 is coupled to the first interface link 86 of the carrier 70 with a guide block, shown as guide 78. According to an exemplary embodiment, guide 78 is fastened (e.g., welded, bolted, etc.) to the underside of the tube 72. As shown in FIGS. 6-7, slide bearings 108 are coupled to the second end 102 of the tube 72 and the guide 78. Slide bearings 108 support the tube 72 and facilitate the sliding of the tube 72 relative to the member 74 as the mid boom 34 moves relative to the base boom 32. Slide bearings 108 also support the tube 72 during removal and installation. The fly boom 36 nests within the mid boom 34 and engages the interior surface of the mid boom via slide bearings, shown as wear pads 35. Both the mid boom 34 and the fly boom 36 nest within the base boom 32. The mid boom 34 engages the interior surface of the base boom 32 via slide bearings, shown as wear pads 33.

According to an exemplary embodiment, the fly tube 76 is a hollow, elongated member that is configured to be received in the interior volume 19 of the boom 16. The fly tube 76 is open on either end and extends along the length of the fly boom 36. The fly tube 76 is fixed to the fly boom 36. By way of example, fly boom 36 may be welded to the top wall 114 of the fly boom 36. The fly tube 76 is therefore timed to move with the fly boom 36. The second end 83 of the carrier 70 is coupled to the fly boom 36 at an end of the fly tube 76. According to an exemplary embodiment, the second interface link 88 of the carrier 70 is coupled to brackets or flanges 116 with a bolted connection.

The carrier 70 is fully supported throughout the entire range of motion of the boom 16 from a fully extended position to a fully retracted position. As shown in FIGS. 6 and 7, with the boom 16 in a retracted position, the fly boom 36 and the mid boom 34 are retracted into the base boom 32 such that the member 74 is within the interior of the fly boom 36 and the majority of the carrier 70 and the tube 72 are housed within the member 74. In the retracted position, the carrier 70 includes a first supported portion 120 resting on the inner surface 92 of a sidewall 90 of the member 74. The first supported portion 120 includes the length of the carrier 70 extending from the first interface link 86 coupled to the guide 78 to the open end 96 of the member 74. A curved portion 122 of the carrier 70 curls upward, out of the interior of the member 74 to the second interface link 88, which is coupled to the top of the interior of the fly boom 36. The upper edge 97 of the open end 96 of the member 74 is recessed relative to the lower edge 98 such that the curved portion 122 may clear the upper edge 97 while the end of the first supported portion 120 is supported by the lower sidewall 90. Almost the entirety of the length of the carrier 70 (e.g., all but four links, ninety-five percent, etc.) and the lines 71 running therethrough are therefore supported by the inner surface 92 of the member 74. In the retracted position, the working length of the carrier 70 is equal to the length of the first supported portion 120. As shown in FIG. 6, the first supported portion 120 contacts the member 74 along its entire length.

Figure 8:
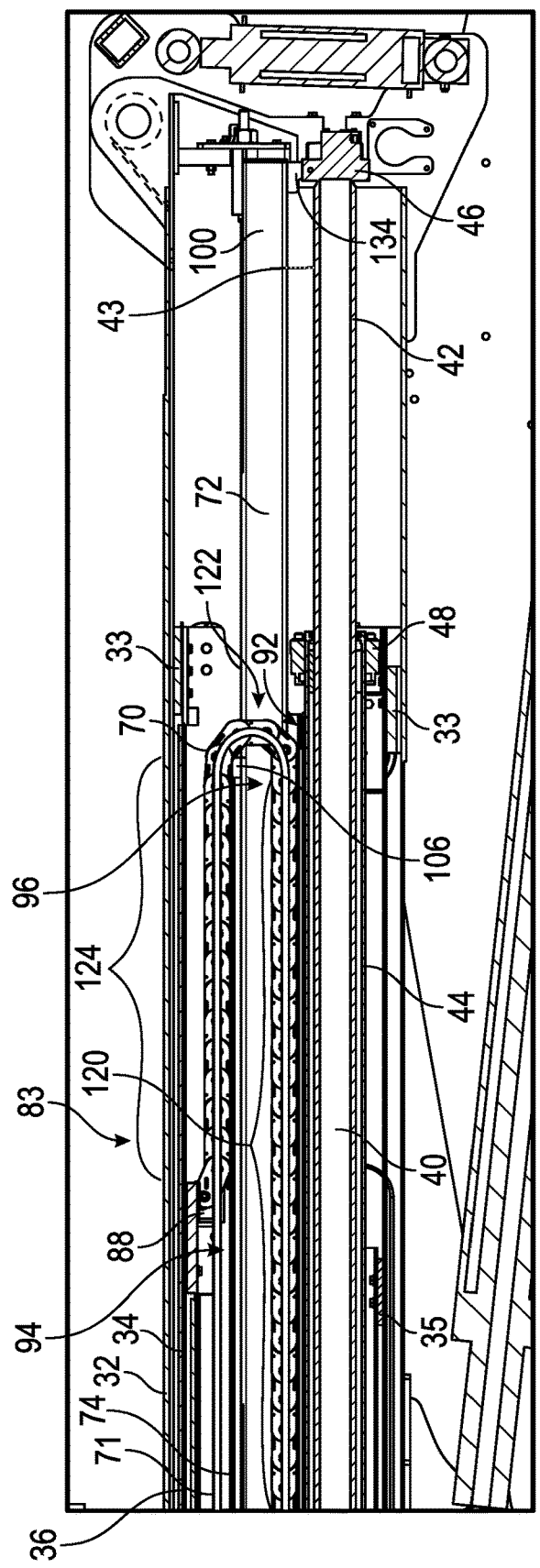
FIG. 8 is a detail cross section view of a portion of the boom assembly.
Figure 9:
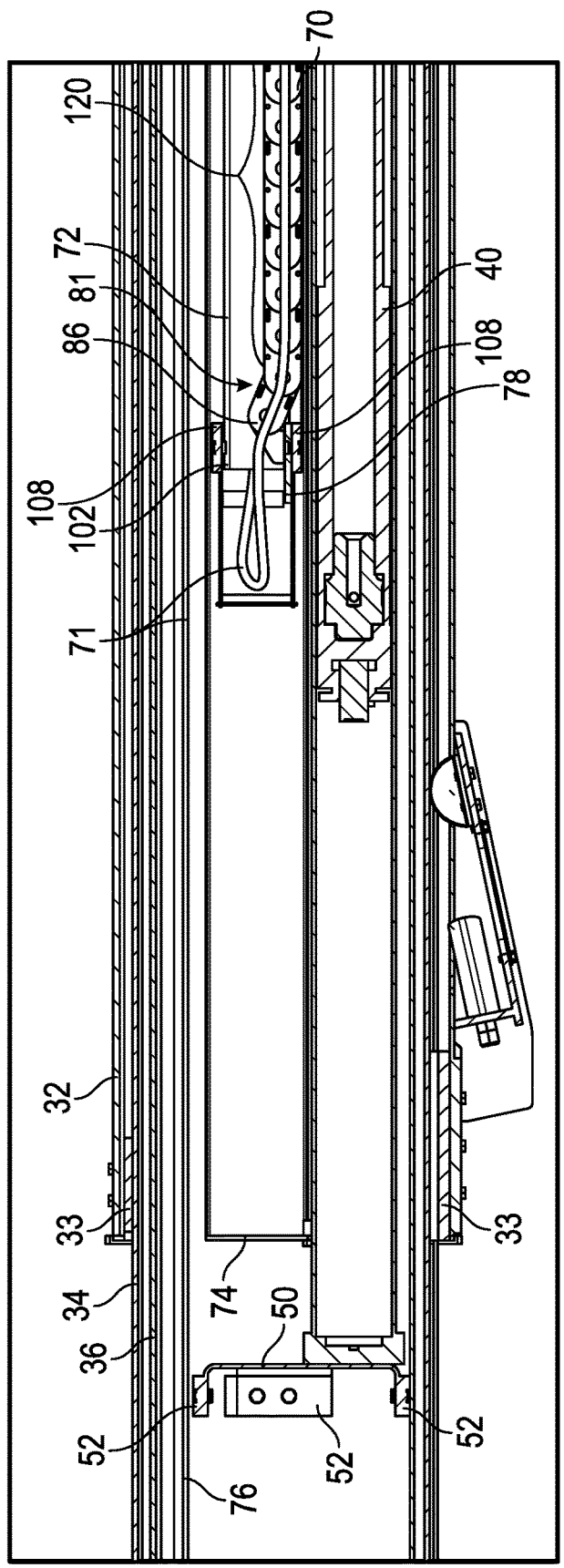
FIG. 9 is a detail cross section view of a portion of the boom assembly.

As shown in FIGS. 8 and 9, as the boom 16 extends, the member 74 and the mid boom 34 pay out about 1:1 (i.e. within ten percent of a 1:1 ratio) with respect to the tube 72 and the base boom 32. Simultaneously, the fly tube 76 and the fly boom 36 pay out about 1:1 (i.e. within ten percent of a 1:1 ratio) with respect to the member 74 and the mid boom 34. The tube 72 and the first end 81 of the carrier 70 move relative to the member 74 towards the open end 96 while the fly boom 36 and the second end 83 of the carrier 70 move relative to the member 74 away from the open end 96 at the same rate. The carrier 70 is therefore paid out of the interior of the member 74 and curls around the upper edge 97 of the open end 96 to extend along the top of the member 74.

The second supported portion 124 includes the length of the carrier 70 extending from the second interface link 88 coupled to the fly boom 36 to the curved portion 122 curling around the upper edge 97 of the member 74. According to the exemplary embodiment shown in FIG. 8, the second supported portion 124 contacts the outer surface 94 of the top sidewall 90. As the carrier 70 is paid out of the member 74, the length of the first supported portion 120 is reduced while the length of the second supported portion 124 is increased. In an intermediate position, the working length of the carrier 70 is equal to the length of the first supported portion 120 and the length of the second supported portion 124.

According to an exemplary embodiment, the distance between the sidewall 90 of the member 74 and the top wall 114 of the fly boom 36 is greater than the height of the links 80. The dimensions of the individual links 80 maintains the geometry of the curved portion 122 such that there is a clearance between the carrier 70 and the outer surface 94 of the member 74 proximate the upper edge 97, preventing damage or wear due to contact between the carrier 70 and the upper edge 97 as the carrier 70 is paid out from or taken into the member 74. The links 80 along the top of the member 74, other than those at open end 96 rest on and are supported by the outer surface 94 of the member 74. As shown in FIG. 8, the first supported portion 120 and the second supported portion 124 contact member 74 along their entire lengths.

With the boom 16 in an extended position, the fly boom 36 and the mid boom 34 are extended from the base boom 32. In such a configuration, the length of the first supported portion 120 may be minimized, with the first end 81 of the carrier 70 moved to the open end 96 of the member 74 and the curved portion 122. In the extended position, almost the entirety of the length of the carrier 70 and the lines 71 running therethrough are therefore supported by the outer surface 94 of the member 74. In the extended position, the working length of the carrier 70 is equal to the length of the second supported portion 124.

When the boom 16 is retracted, the movement of the carrier 70 is reversed. The member 74 and the mid boom 34 are taken in at about 1:1 (i.e. within ten percent of a 1:1 ratio) with respect to the tube 72 and the base boom 32. Simultaneously, the fly tube 76 and the fly boom 36 are taken in at about 1:1 (i.e. within ten percent of a 1:1 ratio) with respect to the member 74 and the mid boom 34. The tube 72 and the first end 81 of the carrier 70 move relative to the member 74 away from the open end 96 while the fly boom 36 and the second end 83 of the carrier 70 moves relative to the member 74 toward the open end 96 at the same rate. The carrier 70 is therefore taken in to the interior of the member 74 and curls around the upper edge 97 of the open end 96 to be received in the interior of the member 74. As the carrier 70 is taken in to the member 74, the length of the first supported portion 120 is increased while the length of the second supported portion 124 is reduced.

Fully supporting the carrier 70 reduces damage to lines 71 that may otherwise occur due to the weight of carrier 70 and lines 71 (i.e. cause strain damage). Therefore, an internally positioned and fully supported carrier 70 increases the product life of the lift machine.

A cartridge, shown as magazine 130, includes the carrier 70, lines 71, and the tube 72. Magazine 130 may be removed from the interior volume 19 of the boom 16 for maintenance. In this way, the carrier 70 and the lines 71 may be serviced without extensive disassembly of the boom 16, removal of the member 74, or removal of the cylinder 40.

Figure 10:
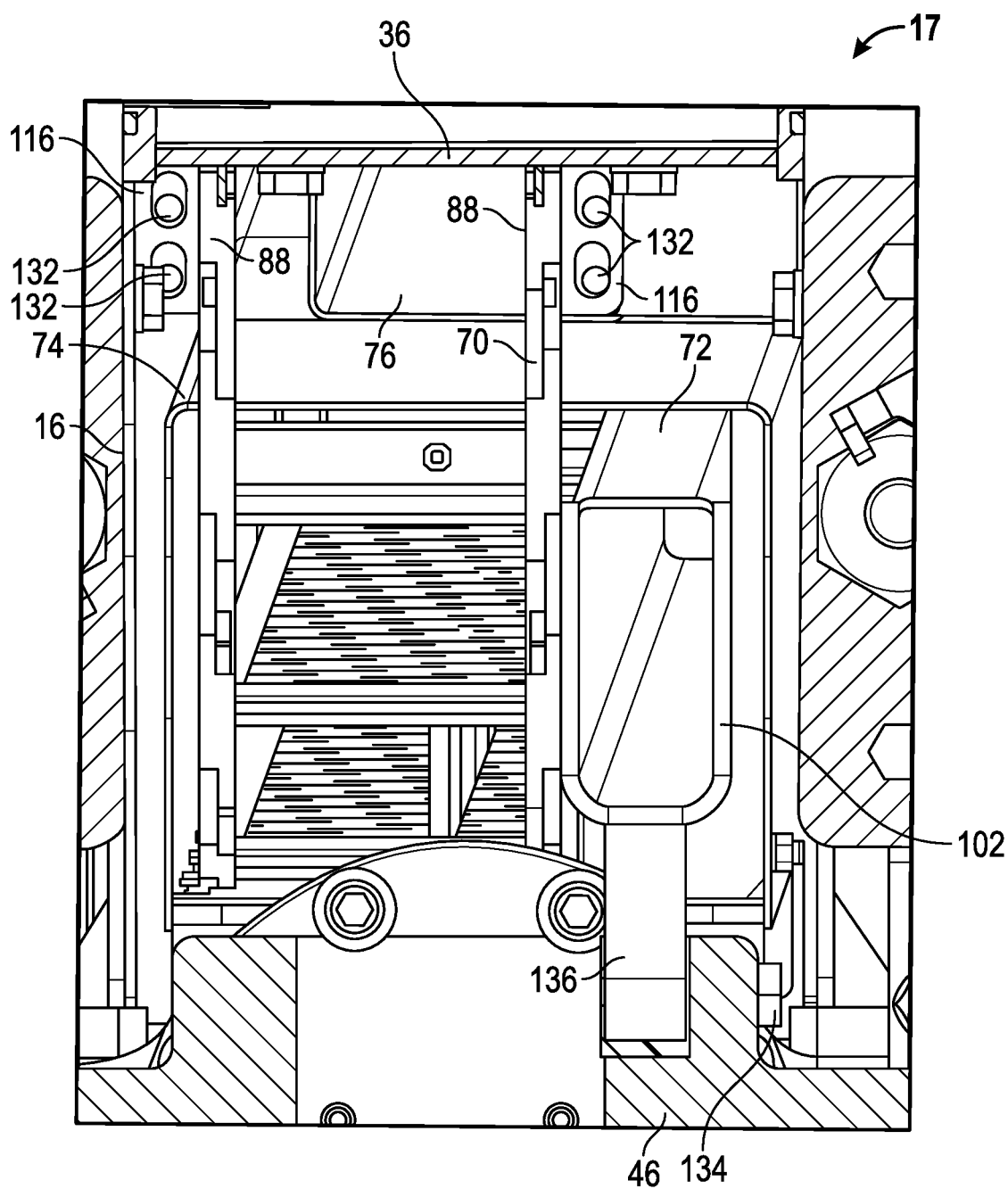
FIG. 10 is an elevation view of the rear portion of the boom assembly, according to an exemplary embodiment.

Referring to FIG. 10, the carrier 70 and the tube 72 are coupled to the boom 16 with easily accessible bolted connections. With the boom 16 in the retracted position, the second end 83 of the carrier 70 is moved toward the open first end 17 of the boom 16. According to an exemplary embodiment, each side of the second interface link 88 is coupled to the bracket 116 on the fly boom 36 with a pair of bolts 132, along with any other associated hardware (e.g., nuts, washers, etc.). The second end 102 of the tube 72 is coupled to the bracket 46 with a bolt 134 passing through an arm 136 extending from the tube 72. In other embodiments, the second interface link 88 may be coupled to the fly boom 36 and the tube 72 may be coupled to the bracket 46 with another removable coupling mechanism (e.g., a clevis pin, a spring-loaded clip or bracket, etc.).

Figure 11:
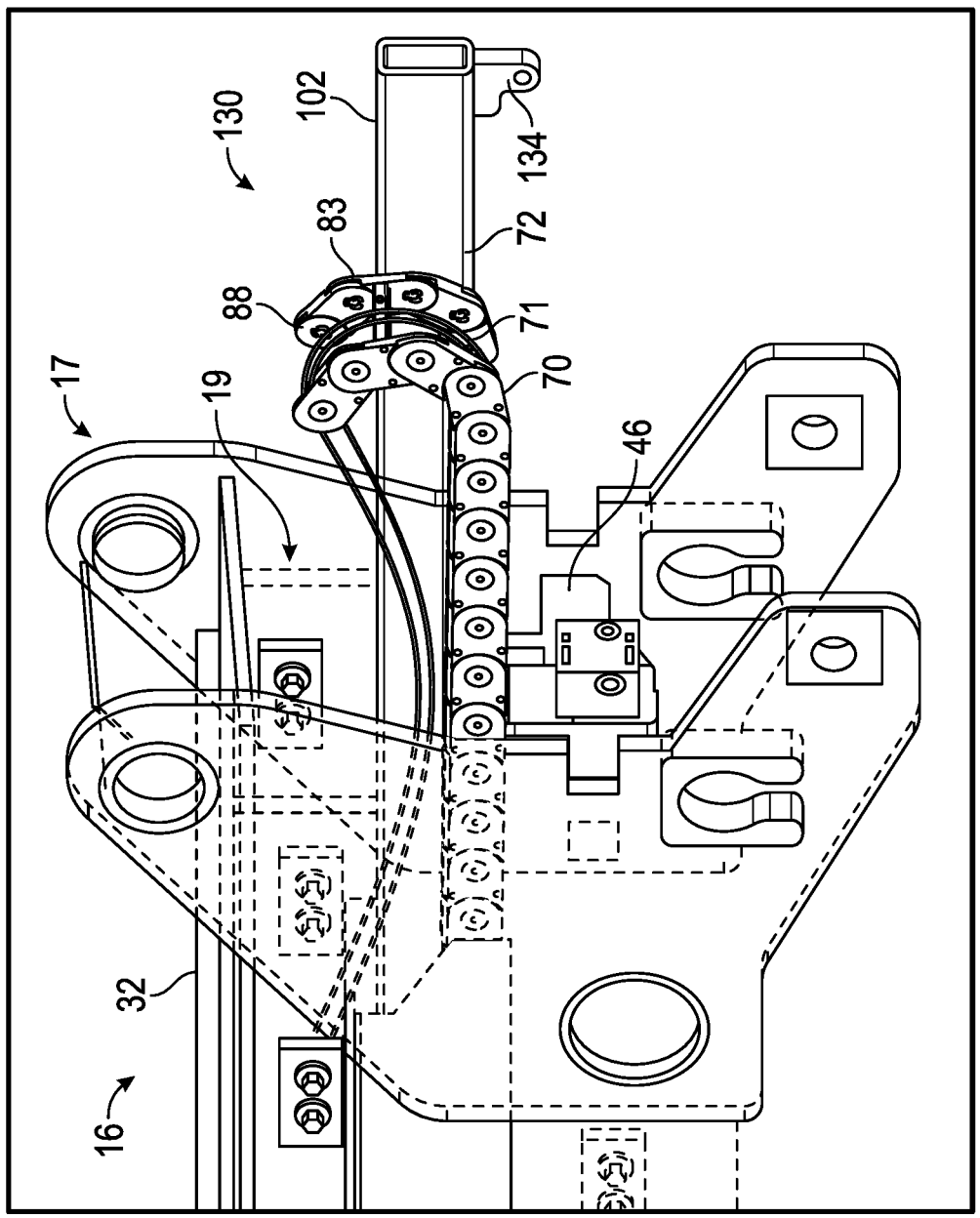
FIG. 11 is an elevation view of the rear of the boom assembly with a partially removed carrier system, according to an exemplary embodiment.

Referring to the exemplary embodiment shown in FIG. 11, any hydraulic, pneumatic, or electrical lines may be decoupled. The magazine 130 including the carrier 70 and the tube 72 may be slid from the interior of the support member 74 out of the rear of the boom 16. According to an exemplary embodiment, the member 74 does not need to be removed from the boom 16 to service the lines 71. After service, the electrical, pneumatic, and electrical lines may be again coupled. The carrier 70 and the tube 72 may be slid back into the member 74 through the back end of the boom 16. According to an exemplary embodiment, the push tube 72 is re-secured to the bracket 46 with the bolt 134, and the carrier 70 is coupled to the fly boom with the bolts 132.

According to the alternative embodiment shown in FIGS. 12A-12B, a boom assembly, shown as boom assembly 200, includes a power track, shown as carrier 270. According to an exemplary embodiment, carrier 270 includes a first end, a first supported portion, a curved portion, and a second end. As shown in FIGS. 12A-12B, boom assembly 200 includes a push tube, shown as tube 272, and a channel, shown as member 274. The tube 272 includes a first end configured to be coupled to a base boom of a boom lift and a second end coupled to an inner surface of member 274 with a bearing (i.e. wear pad, etc.), shown as slide bearing 208. According to an exemplary embodiment, the first end of carrier 270 is coupled to the second end of tube 272. The tube 272 defines a support surface 273 that interfaces with (e.g., contacts, supports, etc.) the first supported portion of carrier 270 when boom assembly 200 is in the retracted position, as shown in FIG. 12A. The member 274 defines an outer support surface 294 and includes an upper edge 297. While not shown in FIGS. 12A-12B, it should be understood that boom assembly 200 may include various boom sections (e.g., a base boom, a mid boom, a fly boom, etc.), sheaves, or still other components.

According to an exemplary embodiment, the carrier 270 manages lines 271 extending along the length of boom assembly 200. The lines 271 extend through an inner volume of tube 272, according to an exemplary embodiment. During operation of boom assembly 200, member 274 pays out relative to tube 272 (e.g., at a ratio of about 1:1). Simultaneously, the second end of carrier 270, which may be coupled to a fly boom section, also pays out relative to tube 272 (e.g., at a ratio of about 1:1). The carrier 270 is therefore paid out of the interior of the member 274 and curls around the upper edge 297 of the member 274. As the carrier 270 pays out, a second supported portion is defined by a length of carrier 270 that interfaces with (e.g., contacts, is supported by, etc.) outer surface 294 of member 274. Almost the entirety of the length of the carrier 270 (e.g., all but four links, ninety-five percent, etc.) and the lines 271 positioned therein are therefore supported by the support surface 273 when boom assembly 200 is in the retracted position. Almost the entirety of the length of the carrier 270 and the lines 271 positioned therein are supported by the support surface 273 and the outer support surface 294 as the boom assembly 200 extends.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A boom assembly for a lift device, comprising:
a plurality of telescoping boom sections including a base boom section, a mid boom section, and a fly boom section, wherein the plurality of telescoping boom sections define an inner volume;
a push tube directly coupled to the base boom section;
a support member positioned within the inner volume, the support member comprising sidewalls having an inner surface and an outer surface; and
a power track positioned within the inner volume and comprising a plurality of movable links, a first supported portion that interfaces with at least one of the inner surface of the support member or a surface of the push tube, and a second supported portion that interfaces with the outer surface of the support member;
wherein the power track includes a first end attached to a first end of the push tube, and the push tube includes a second end opposite the first end of the push tube and the second end of the push tube is directly coupled to the base boom section.

2. The boom assembly of claim 1, wherein the power track includes a first end coupled to the base boom section and a second end coupled to the fly boom section.

3. The boom assembly of claim 2, wherein the first supported portion is offset from the second supported portion.

4. The boom assembly of claim 2, wherein the first end of the power track is coupled to the base boom section with a first interface link and the second end of the power track is coupled to the fly boom section with a second interface link, the length of the power track between the first interface link and the second interface link defining a working length of power track.

5. The boom assembly of claim 4, wherein the entire length of the power track between the first supported portion and the second supported portion is supported by the support member in at least one configuration of the boom assembly.

6. The boom assembly of claim 5, wherein the first supported portion and the second supported portion contact the support member along their entire lengths.

7. The boom assembly of claim 6, further comprising a guide block positioned within the support member, wherein the guide block is coupled to the first end of the power track and directly coupled to an end of the push tube.

8. The boom assembly of claim 1, wherein the mid boom section and the fly boom section are translatable between a retracted position and an extended position, and wherein the power track pays out as the mid boom section and the fly boom section translate from the retracted position to the extended position.

9. The boom assembly of claim 8, wherein the length of the first supported portion decreases and the length of the second supported portion increases as the plurality of telescoping boom sections translate from the retracted position to the extended position.

10. The boom assembly of claim 8, further comprising a telescopic cylinder including a rod and a tube, wherein the rod is coupled to the base boom section and the tube is coupled to the support member.

11. The boom assembly of claim 10, wherein the mid boom section and the support member pay out at a rate of about 1:1 relative to the base boom section and the fly boom section pays out at a rate of about 1:1 relative to the mid boom section.

12. The boom assembly of claim 11, further comprising a fly carrier tube coupled to the fly boom section.

13. A lift device, comprising:
a chassis;
a plurality of telescoping boom sections coupled to the chassis and including a base boom section, a mid boom section, and a fly boom section, wherein the plurality of telescoping boom sections define an inner volume;
a push tube directly coupled to the base boom section;
a support member positioned within the inner volume, the support member comprising sidewalls having an inner surface and an outer surface; and
a power track coupled to the push tube, positioned within the inner volume, and comprising a first portion that interfaces with the inner surface of the support member and a second portion that interfaces with the outer surface of the support member; wherein the power track is directly or indirectly laying on a surface of the push tube.

14. The lift device of claim 13, wherein the plurality of telescoping boom sections are translatable between a retracted position and an extended position, the power track configured to pay out as the plurality of telescoping boom sections translates from the retracted position to the extended position.

15. The lift device of claim 13, further comprising at least one of an aerial work platform or a lift fork or combinations thereof coupled to an end of the fly boom section.

16. The lift device of claim 13, further comprising at least one of a hose or a cable or combinations thereof positioned within the power track.

* * * * *